United States Patent [19]
Bjorkman, Jr.

[11] 3,993,502
[45] Nov. 23, 1976

[54] METAL HALOGEN HYDRATE BATTERY SYSTEM

[75] Inventor: Harry K. Bjorkman, Jr., Birmingham, Mich.

[73] Assignee: Energy Development Associates, Madison Heights, Mich.

[22] Filed: Oct. 29, 1975

[21] Appl. No.: 626,793

[52] U.S. Cl. .................................. 429/51; 429/19; 429/20; 429/21
[51] Int. Cl.² ...................................... H01M 47/00
[58] Field of Search ................. 136/6 F, 6 E, 86 C, 136/86 A, 155, 154, 161, 162, 164, 165; 423/462

[56] References Cited
UNITED STATES PATENTS

| | | | |
|---|---|---|---|
| 3,713,888 | 1/1973 | Symons | 136/162 X |
| 3,793,077 | 2/1974 | Behling | 136/6 E |
| 3,814,630 | 6/1974 | Bjorkman, Jr. | 136/86 A |
| 3,823,036 | 7/1974 | Bjorkman, Jr. | 136/6 F |

Primary Examiner—Anthony Skapars
Attorney, Agent, or Firm—Ostrolenk, Faber, Gerb & Soffen

[57] ABSTRACT

A metal-halogen-hydrate electrical energy system having two fluid flow loops operating in parallel driven from the same pump.

7 Claims, 3 Drawing Figures

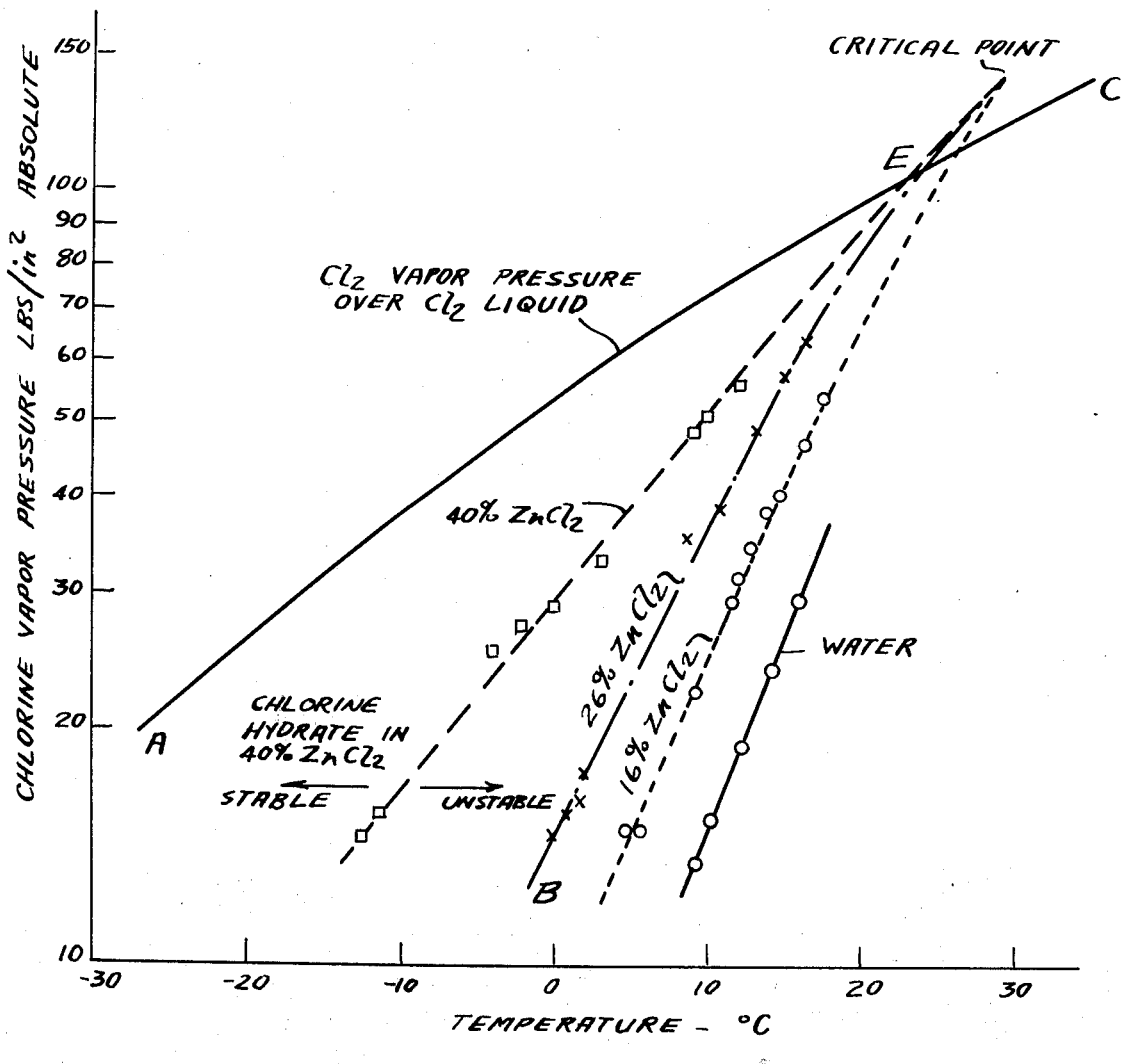

METAL HALOGEN HYDRATE BATTERY SYSTEM

BACKGROUND OF THE INVENTION

1. Field of the Invention

The present invention relates to an electrical energy storage system, such as a battery, and more particularly, a battery of the metal/halogen/hydrate type.

2. Description of the Prior Art

The electrical energy storage system utilizes a halogen hydrate as the source of a halogen component for reduction at a normally positive electrode and an oxidizable metal adapted to become oxidized at a normally negative electrode during the normal discharge of the storage system. As aqueous electrolyte is employed for replenishing the supply of the halogen component as it becomes reduced at the positive electrode. The electrolyte contains the dissolved ions of the oxidized metal and the reduced halogen and is circulated between the electrode area and a storage area containing halogen hydrate which progressively decomposes during a normal discharge of the electrical energy storage system, liberating additional elemental halogen to be consumed at the positive electrode.

Electrical energy storage systems or secondary batteries of this type are categorized as being of the so-called high energy density (H.E.D.) type since they are capable of supplying upwards of 50 watt hours of electric power per pound of weight. The high energy capacity and compactness of such H.E.D. batteries renders them particularly satisfactory for use as principal or auxiliary sources of electrical energy in both mobile and stationary power plant systems. A metal/halogen/hydrate secondary storage battery of the foregoing type is described in detail in U.S. Pat. No. 3,713,888, issued Jan. 30, 1973 entitled "Process for Electrical Energy Using Solid Halogen Hydrate", which is owned by the same assignee as the present invention. The specific teachings of the aforementioned United States patent application are incorporated herein by reference.

Among the advantages of secondary storage batteries of the metal/halogen/hydrate type is the ability of such systems to be refueled or recharged quickly and efficiently whereby they are again restored to full-charged capacity. In a refuelable secondary storage battery, the halogen constituent is replenished by withdrawing a proportion of the aqueous electrolyte and substituting therefor a halogen hydrate which, upon decomposition during normal discharge, liberates elemental halogen and water, whereby the concentration of the metal halide in the electrolyte remains substantially constant during the discharge cycle. The halogen hydrate comprises a compact and extremely convenient method of storing and replenishing the halogen component in the storage system. In a rechargeable storage battery system, a reverse electrical current is applied to the electrode area, whereby the halide is oxidized to the elemental halogen which is recovered as a gas and is reconverted in the presence of water in the corresponding halogen hydrate storage area within the system. In either event, the formation of the halogen hydrate is accomplished under controlled temperature conditions, whereby halogen and water are combined to produce a corresponding solid hydrate. This operation can be performed within the system itself or by a central hydrate processing unit disposed remote from the electrical energy storage system.

The present invention is directed to an improved apparatus and process for producing and storing halogen hydrate in an efficient and economical manner utilizing the aqueous electrolyte as a source of the water and halogen components or, alternatively, sources of these two components independent of the electrical energy storage system.

SUMMARY OF THE INVENTION

The benefits and advantages of the present invention are achieved by a secondary electrical energy storage system incorporating or associated with a halogen hydrate forming and storing system which produces solid halogen hydrate in a form suitable for replenishing the hydrate reservoirs of such storage systems. The halogen hydrate forming and storing system is fully operable upon charge and discharge of the battery system by the use of a single centrifugal pump, which results in simplicity, low cost and reduced potential maintenance of the system.

Still further benefits and advantages of the present invention will become apparent upon a reading of the description of the preferred embodiment, taken in conjunction with the accompanying drawing, wherein:

BRIEF DESCRIPTION OF THE DRAWINGS

FIG. 3 is a phase diagram for a halogen hydrate system in which the halogen comprises chlorine, the metal comprises zinc and the aqueous solution contains zinc chloride.

DESCRIPTION OF THE PREFERRED EMBODIMENT

Figure 1:
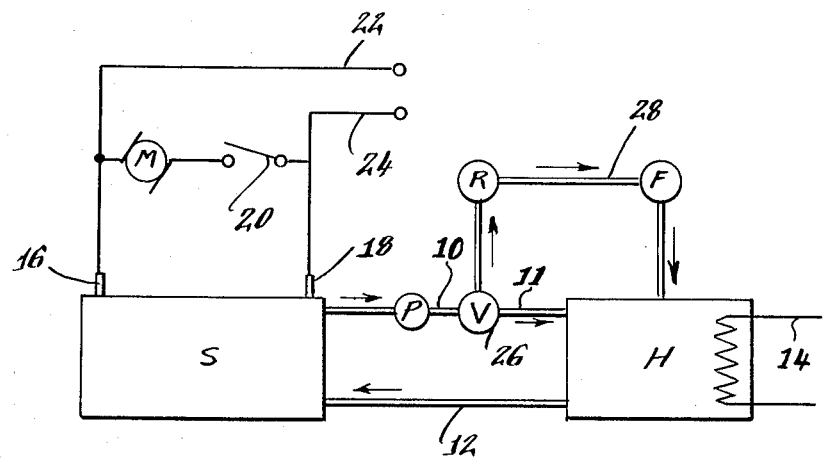
FIG. 1 is a schematic flow sheet illustrating the important components of an electrical energy storage system of the type to which the present invention is applicable.

The oxidizable metal/halogen/hydrate electrical energy storage system to which the present invention is applicable comprises an electrolyte consisting of a solution containing a dissolved metal halide and a dissolved and/or entrained halogen gas which is adapted to be reduced upon coming in contact with the normally positive electrode of a cell during the normal discharge cycle of the device. The electrolyte may further contain various additives and ingredients to impart controlled modifications and/or variations in the physical and chemical properties thereof in order to provide optimum efficiency in operation of the electrical energy storage device under different operating circumstances.

In accordance with a preferred practice of the present invention, the electrolyte is comprised of an aqueous solution which may contain from as little as about 0.1 percent by weight up to a saturated concentration of a metal halide consisting of metals selected from the group consisting of the Group VIII of the Periodic Chart (namely: Fe, Co, Ni, Ru, Rh, Pd, Os, Ir and Pt), metals of the Lanthanum Series (namely: Ce, Pr, Nd, Pm, Sm, Eu, Gd, Tb, Dy, Ho, Er, Tm, Yb and Lu), and Actinium Series (namely: Th, Pa, U, Np, Pu, Am, Cm, Bk and Cf), in addition to Zn, Sc, Ti, V, Cr, Mn, Cu, Ga, Y, Zr, Nb, Mo, Tc, Ag, Cd, In, Sn, Hf, Ta, W, Re, Au, Hg, Tl, Pb, Bi, Li, K, Na, Rb, Cs, Be, Mg, Ca, Sr, and Ba. Those metals which react with water may be amalgamated to induce stability, such as amalgams (solutions in mercury). Of the foregoing metals, zinc constitutes the most preferred metal, while iron, cobalt and nickel are preferable to the remaining enumeratd metals. Of the various halogen constituents, chlorine and bromine are preferred and the chloride salts of the aforementioned preferred metals are particularly satisfactory in the practice of the present invention and constitute a preferred embodiment thereof. Particularly satisfactory results are obtained employing an aqueous electrolyte incorporating zinc chloride as the metal halide.

Although as previously indicated concentrations of the metal halide in the electrolyte as low as about 0.1 percent can be employed, it is preferred that the metal halide be present in concentrations of at least about 5% to about 50% and more usually in concentrations from about 10 up to about 35% by weight. In those instances in which zinc chloride is utilized as the metal halide, a maximum conductivity of the electrolyte is obtained when a concentration of about 25% by weight of zinc chloride is present. Accordingly, when zinc chloride is the metal halide in an aqueous electrolyte, concentrations ranging from about 10 to about 35 % by weight have been found particularly satisfactory.

The electrochemical reaction that occurs in the storage battery is represented by the following equations, which are representative of the situation in which the oxidizable metal is zinc, the halogen is chlorine and the hydrate is chlorine hydrate.

$$Zn^\circ\ Zn^\circ \rightarrow Zn^{++} + 2e$$

$$Cl_2^\circ + 2e \rightarrow 2Cl^-$$

$$Cl_2 + 8H_2O \rightleftharpoons Cl_2 \cdot 8H_2O$$

As will be noted from the foregoing equations, the progressive oxidation of the zinc to a zinc ion which becomes dissolved in the electrolyte and a corresponding reduction of elemental chlorine to a chloride ion, which also becomes dissolved in the electrolyte, would tend to effect an increase in the concentration of the metal halide in the electrolyte were it not for the fact that the progressive decomposition of the halogen hydrate results in a progressive liberation of water serving as a diluent, thereby maintaining the metal halide salt concentration in the electrolyte reasonably constant throughout the discharge cycle of the storage battery. Although the concentration of the electrolyte remains substantially constant, the total volume thereof progressively increases and appropriate provision is made in the system for accommodating such an increased electrolyte volume during operation of the storage device. As halogen hydrate decomposes, more space is available in the storage area for handling the electrolyte. A corresponding reduction in the volume of electrolyte occurs during a recharging of the electrical storage system in which a corresponding amount of dissolved metal halide is removed from the electrolyte and a resultant halogen, in combination with a portion of the water, is formed into the corresponding halogen hydrate for storage.

Referring now in detail to the drawings, and as may be best seen in FIG. 1, a typical flow arrangement of a rechargeable electrical energy storage system is illustrated in accordance with the preferred practice of the present invention. As shown, the system comprises an electrode area or stack, indicated as S, which is comprised of one or more usually a plurality of individual cells, each containing a normally positive electrode and a normally negative electrode. The stack is connected by means of an outlet pipe 10 and a return pipe 12 to a halogen hydrate storage area or receptacle, indicated at H, through which the electrolyte is continuously recirculated such as by means of a pump P. The passage of the electrolyte directly through the hydrate storage reservoir H, by means of valve and line 11 during a normal discharge cycle of the storage device effects a progressive decomposition of the halogen hydrate therein, whereby the liberated halogen gas is dissolved and/or entrained in the electrolyte and is conveyed by means of the return line 12 to the stack S for replenishment of the supply of elemental halogen at the normally positive electrodes therein. Since the decomposition of the halogen hydrate is an endothermic reaction, the storage reservoir H suitably may be provided with a heat exchanger, indicated at 14, for maintaining the halogen hydrate and the electrolyte therein at a temperature at which optimum performance of the storage battery is achieved during a discharge cycle.

During the recharging cycle, a reversal of the chemical reaction is effected whereby the oxidized metal present in the form of a dissolved ion in the electrolyte is reduced at the normally negative electrode and deposits or plates out while the halide ion becomes oxidized at the normally positive electrode, returning to the elemental state in the form of dissolved or minute gas bubbles in the electrolyte. The halogen gas thus formed is continuously removed from the cell by the electrolyte through the outlet line 10 and the electrolyte is diverted, such as by a selector valve 26, through a branch circuit 28 having a cooling or refrigeration device R therein and a hydrate former device F for effecting a regeneration of the halogen hydrate. The halogen hydrate thus regenerated is returned by the circulating electrolyte to the storage reservoir H in which it is separated and retained in readiness for the next discharge cycle of the storage device, electrolyte separated from the halogen hydrate within H is returned to the cell, S, by means of line 12.

In accordance with this invention, the hydrate former F and the cooling or refrigeration apparatus R are incorporated in the system in accordance with the arrangement schematically illustrated in FIG. 1. A recharging of the electrical energy storage system can conveniently be achieved by connecting the wires 22, 24 to a commercial source of a rectified current, such as purchased from a local utility, effecting an in situ recharging of the system from time to time as may be necessary. Systems of this arrangement are suitable for use as the principal or auxiliary power system for the propulsion of vehicles or other mobile apparatus.

Alternatively, the hydrate former F and the refrigeration or cooling unit R can be disconnected from the system during normal discharge thereof and are located at a central processing or service station. In accordance with this latter arrangement, an appropriate amount of electrolyte is withdrawn from the electrical storage systems which are in a substantially discharged condition and the electrolyte is reprocessed through the local service station processing facility to effect a regeneration of the halogen hydrate and a recovery of the metal. The halogen hydrate and metal can be directly inserted into the discharged storage battery, effecting a refueling thereof and a restoration of the battery to a fully charged condition. The refrigeration unit R and the hydrate former provide for increased efficiency due to the larger size of such units, which are adaptable for servicing a plurality of storage batteries, while at the same time providing for a proportional reduction in the weight of such storage battery systems in view of the elimination of the refrigeration and hydrate forming components.

Figure 2:
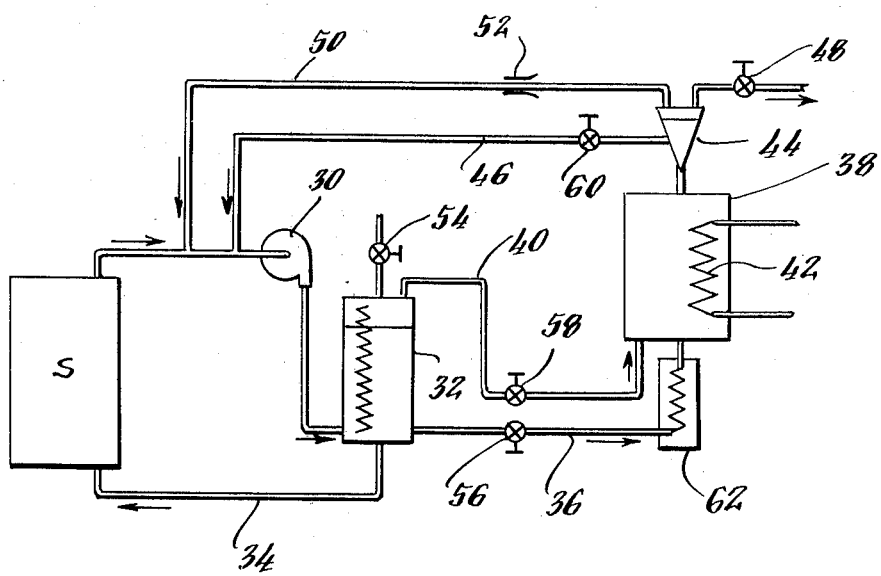
FIG. 2 is a schematic flow diagram in greater detail of the electrical energy storage system of the present invention.

In either event, a hydrate former constructed in accordance with the preferred practice of the present invention is illustrated in FIG. 2 of the drawing. The particular temperature, pressure and operating characteristics of the hydrate former shown will vary depending upon the composition of the electrolyte or aqueous solution employed, the type of halogen utilized and with the concentration and type of metal ions present. A phase diagram is shown in FIG. 3 which depicts the temperature-pressure relationship for the halogen chlorine, the preferred halogen for the present invention, when the gas phase is in equilibrium over the solid hydrate in aqueous solutions of zinc chloride of various concentrations. As noted in FIG. 3, the area to the left of any line of zinc chloride concentration encompasses those conditions for which chlorine hydrate is present and may be readily formed in an electrolyte of that concentration. The area to the right of any line encompasses those conditions for which gaseous chlorine is present in the aqueous media. Above and to the left of line A C, liquid chlorine is present. In the area bounded by points A, B and E, chlorine hydrate is present as a solid in a 25% concentration of zinc chloride in water. It will be appreciated that the phase diagram, as shown, encompasses three phases, namely: solid, liquid and gas. The critical temperature of a halogen hydrate, such as chlorine hydrate as shown in FIG. 3, is defined for the purposes of the present invention as that temperature above which a halogen hydrate cannot exist.

Referring now in detail to FIG. 2, a working embodiment of the system is shown. The working system has two fluid flow loops, operating in parallel and driven by the same pump, both on charge and discharge of the system. This results in simplicity of construction, low cost and reduced potential maintenance since as few as possible moving parts are utilized in the working embodiment of the system.

On charge, the electrolyte is pumped by a centrifugal pump 30 from the stack S with the halogen gas dissolved or entrained in the electrolyte. The gas-liquid mixture passes through pump 30 into a filter separator unit 32, the purpose of which is to remove particulate matter and to "break" the froth which comes from the stack so that the gas and liquid will separate. One stream of electrolyte is passed back to the stack through a conduit 34; a second stream of electrolyte is passed from filter-separator unit 32 through a conduit 36 to a hydrate former-store unit 38 where a portion of the water in the electrolyte is combined with the halogen gas taken from filter-separator unit 32 through a conduit 40, to form halogen hydrate.

A typical hydrate former-store unit 38 is shown in U.S. Pat. No. 3,814,630, issued June 4, 1974, and assigned to the same assignee of the present invention. As shown in this patent, hydrate former-store unit 38 is provided with a heat exchanger coil 42, effecting an appropriate extraction or addition of heat to the halogen hydrate/electrolyte to form solid halogen hydrate during the charging of the system.

Excess electrolyte passes through the filter in the top of the hydrate former-store unit 38 into a small secondary separator 44. This liquid electrolyte returns from the bottom of separator 44 through a conduit 46 to the low pressure side of pump 30 where it is recycled. Excess halogen gas in the hydrate former-store unit 38 which is not converted to halogen hydrate, as well as any inert gases which are present are passed through the filter in the top of unit 38 into separator 44, from which a small portion may be vented through a pressure valve 48, since this gas is relatively rich in inerts, having been reduced in halogen content in unit 38. The remaining gas is passed back to the low pressure side of pump 30 by a gas return conduit 50 for recycling. Conduit 50 is equipped with a restrictive orifice 52 which provides restriction to liquid flow but allows gas to flow therethrough freely. When separator 44 is filled with liquid, orifice 52 tends to block the liquid flow resulting in a combined flow to pump 30 only slightly greater than that occurring when the flow is returned by the liquid line 46 alone. If gas should fill separator 44, the gas passes back to the low pressure side of pump 30 through liquid return conduit 46 thereby causing more liquid from the stack loop to flow into the store unit 38.

On discharge, the flows in the various conduits of the system are in the same direction, albeit different quantities are involved. Electrolyte from filter-separator unit 32 is passed through conduit 36 into the hydrate former-store unit 38 where it decomposes the stored halogen hydrate releasing halogen gas. Since the decomposition of the halogen hydrate is an endothermic reaction, coolant flow through heat exchanger 42 is stopped during discharge, unless discharge is stopped and it becomes necessary to cool to stabilize the hydrate. The halogen gas and reconstituted electrolyte return through separator 44 and conduits 52 and 46, respectively, to the low pressure side of pump 30 where it is circulated through the parallel stack loop and hydrate former-store loop. Secondary gas separator 44 operates as before, except during discharge, the vent is not taken through valve 48, but through pressure valve 54 at the top of the filter-separator unit 32, because the concentration of inerts is higher at this point. Further, during the discharge cycle, gas inlet line 40 from the filter-separator unit 32 to the hydrate former-store unit 38 will normally be closed so that gas does not pass through the unit 38 during discharge.

Valves 56, 58 and 60 can be disposed in the various flow lines to control the rate of flow of the fluids in the system by shutting the lines down completely or to vary flow as the pressure drop across the unit 38 changes. An auxiliary heat exchanger 62 can also be provided in the liquid inlet line 36 to the hydrate former-store unit 38 to precool the electrolyte on charge depending on the hydrate requirements. On discharge, coolant flow can also be stopped through the coils of heat exchanger 62.

What is claimed is:

1. In an electrical energy storage system, the combination of
   at least one cell having a normally positive electrode for reducing a halogen disposed in electrical contact therewith and a normally negative electrode for oxidizing an oxidizable metal disposed in electrical contact therewith during an electrical discharge of said cell,
   an aqueous electrolyte containing ions of said metal and halogen, means for circulating said electrolyte through said cell in a first loop, recharging means associated with said storage system including a source of electrical energy to effect an oxidation of the ions of said halogen to the elemental state, means for recovering the elemental halogen produced, and means for forming and storing a quantity of halogen hydrate from a mixture of said recovered halogen and water in said aqueous electrolyte during recharging of said storage system, said circulating means circulating a portion of said electrolyte and said recovered elemental halogen through said halogen hydrate forming and storing means in a second loop, whereby said circulating means can circulate said electrolyte between said cell and hydrate forming and storing means for progressively oxidizing said oxidizable metal and decomposing said halogen hydrate during discharge of said cell to add halogen to said electrolyte for reduction of said halogen during discharge of said cell and can circulate said recovered halogen to said halogen hydrate forming and storing means during charging of said cell.

2. A system in accordance with claim 1 wherein said circulating means is a single pump.

3. A system in accordance with claim 1 wherein said halogen recovery means is disposed in both of said first and second loops.

4. A system in accordance with claim 1 wherein said second loop includes
means for introducing said elemental halogen and said electrolyte into said hydrate forming and storing means in separate streams.

5. A system in accordance with claim 1 wherein said second loop includes
means downstream from said hydrating forming and storing means for separating and recycling excess halogen and electrolyte through said circulating means.

6. A system in accordance with claim 1 including means in said second loop for venting halogen gas.

7. A system in accordance with claim 1 including means in said first loop for venting halogen gas.

* * * * *